March 9, 1926.
1,576,427
G. P. GUIGNARD
RECOVERY OF AMMONIA FROM VINASSES
Filed Oct. 25, 1921
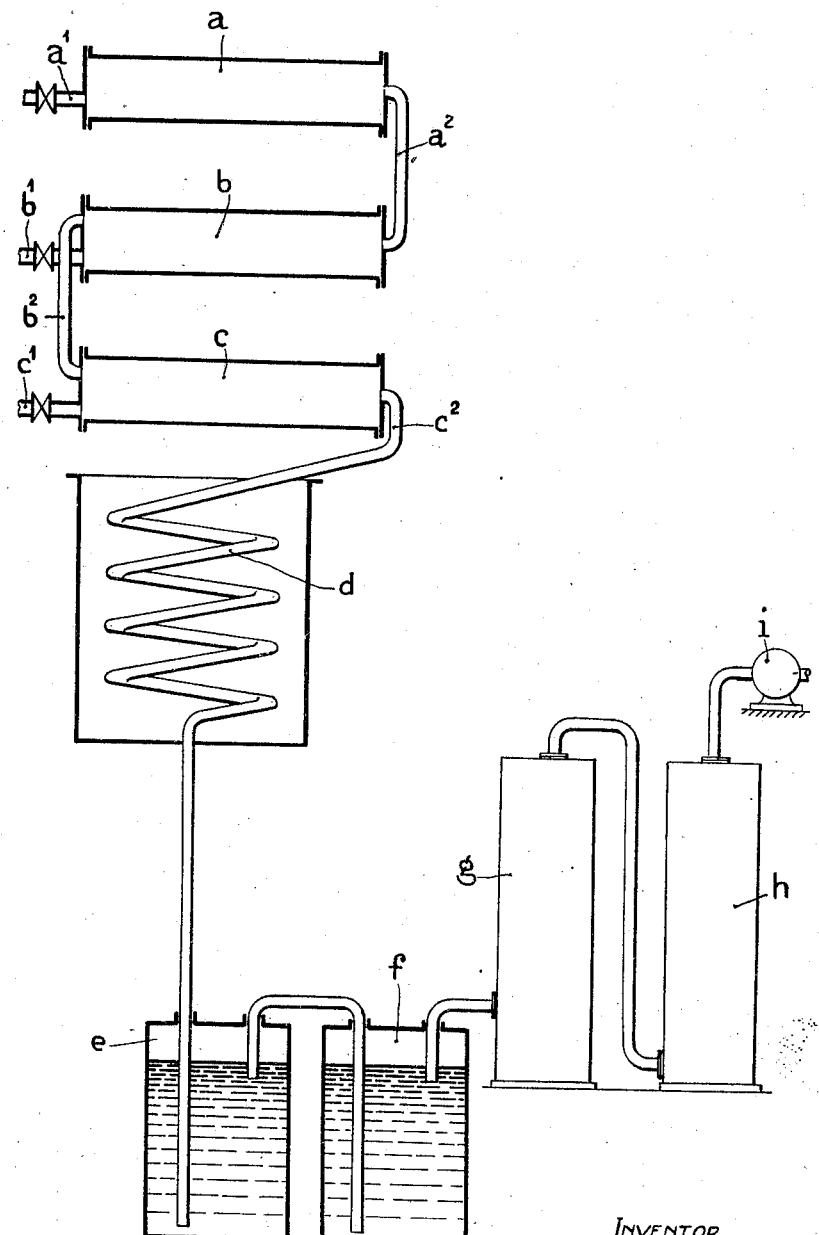
INVENTOR
GASTON PHILIPPE GUIGNARD
BY HIS ATTORNEYS
Howson and Howson Patented Mar. 9, 1926.

1,576,427

UNITED STATES PATENT OFFICE.

GASTON PHILIPPE GUIGNARD, OF MELUN, FRANCE.

RECOVERY OF AMMONIA FROM VINASSES.

Application filed October 25, 1921. Serial No. 510,309.

*To all whom it may concern:*

Be it known that I, GASTON PHILIPPE GUIGNARD, a citizen of the French Republic, and a resident of Melun, Department of Seine and Marne, France, have invented new and useful Improvements in a Recovery of Ammonia from Vinasses, of which the follow is a specification.

The present invention relates to a process for the treatment of vinasses resulting from the distillation of beetroots or molasses, with a view to the recovery of ammonia and acetic acid contained therein. These vinasses are obtained in the form of aqueous solutions containing the same elements; only the relative quantities of the latter vary.

This process consists in submitting to a temperature below 550° centigrade and under vacuum, vinasses containing a quantity of water sufficient for the steam generated to pass through the retorts, come into contact with these vinasses and produce the dissociation of the nitrogenous substances which they contain.

First of all, should this step be necessary, the aqueous solutions of the vinasses are concentrated with the object of reducing the volume of the material to be treated.

The annexed drawing represents diagrammatically one form of apparatus for carrying out the improved process.

The vinasses, previously concentrated or not, according to their water content, are introduced, through the inlets $a^1$, $b^1$, $c^1$, into retorts $a$, $b$, $c$, heated in any suitable manner to a temperature between 450° and 550° centigrade and maintained under vacuum, as explained hereafter. The steam, evolved during this heating, acts upon the vinasses; the steam, together with the gaseous products of the distillation of the vinasses, pass from retort to another through the outlets $a^2$, $b^2$, $c^2$.

Under the action of this steam, the nitrogenous substances contained in the treated products are decomposed according to their nature, in the following manner:

(*a*) The albuminoïd substances yield indol, scatol, and pyrrol;

(*b*) The amines and amides, such as asparagine, aspartic acid, etc., yield ammonia;

(*c*) The betaine yields acetic acid, ammonia and methyl alcohol.

The gaseous products are then treated in the usual manner, which consists of the following steps:

The products of the distillation are passed into a cooler $d$ and thence into sulphuric acid scrubbers $e$, $f$; there is thus obtained an acid solution retaining all the nitrogenous products and the acetic acid.

This acid liquor is distilled in a retort $g$ so as to evaporate the water, the acetic acid and all the volatile products, except the ammonia in the form of ammonium sulphate, and products such as scatol and indol which are found in the residue.

The acetic acid carried over with the steam is passed into a tower $h$ containing solid sodium carbonate ($Na_2CO_3$), maintained at a temperature of 120° centigrade; the acetic acid alone is fixed by the sodium carbonate in the form of sodium acetate. Said tower $h$ is connected to a vacuum pump $i$, which maintains a suitable vacuum in the retorts $a$, $b$, $c$, through the tower $h$, the retort $g$, the closed scrubbers $e$, $f$ and the cooler $d$, throughout the distillation process.

What I claim is:

A process of recovering ammonia from vinasses, which consists in heating, at a temperature between 450 and 550 degrees centigrade and under vacuum, a vinasse containing water, said temperature and vacuum being maintained during the whole treatment.

In testimony whereof I have signed my name to this specification.

GASTON PHILIPPE GUIGNARD.